March 10, 1970  J. KARMAZIN  3,500,016
HEATER ASSEMBLY
Filed Oct. 9, 1967
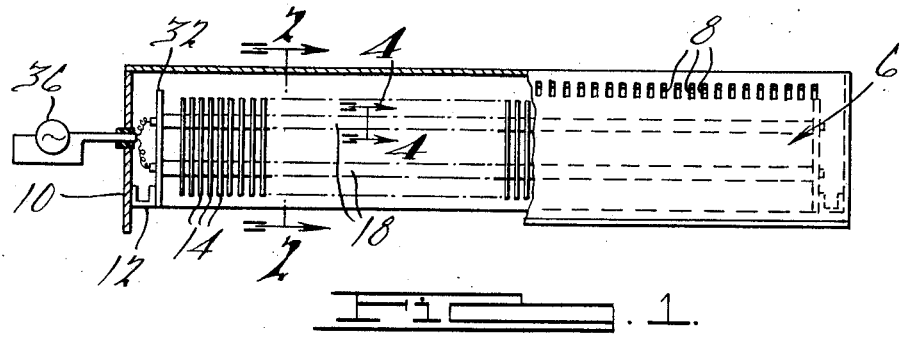
FIG. 1.
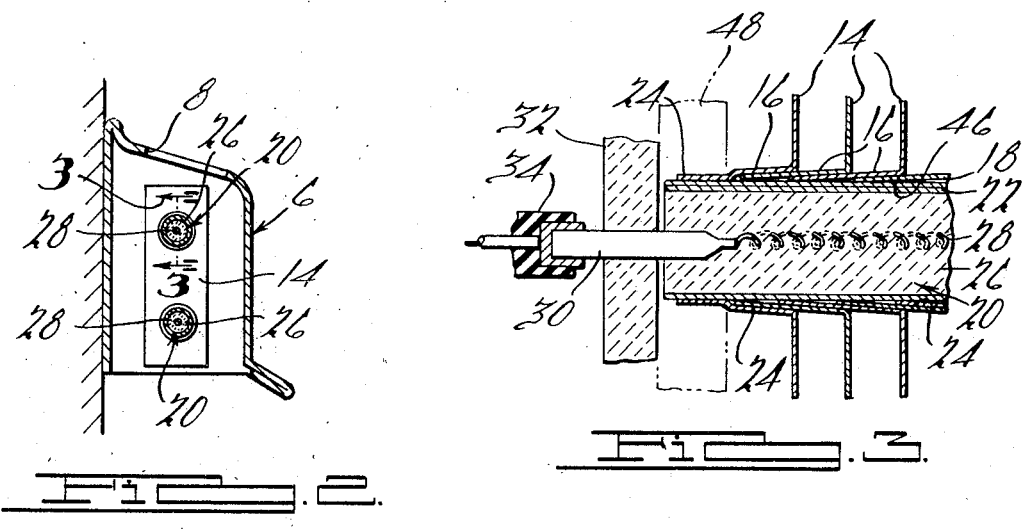
FIG. 2.
FIG. 3.
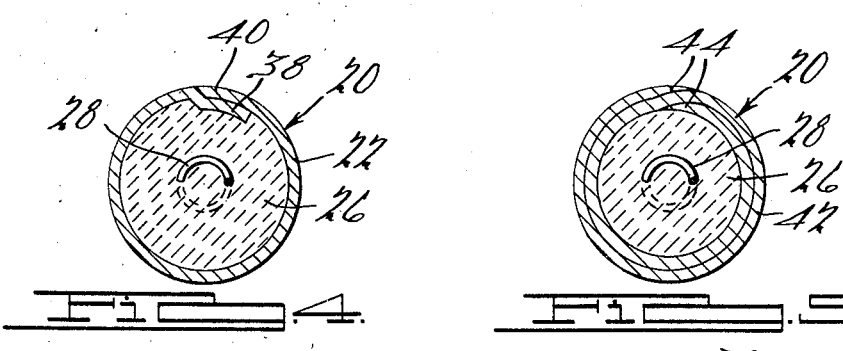
FIG. 4.
FIG. 5.
INVENTOR.
John Karmazin
BY
Harness, Dickey & Pierce
ATTORNEYS United States Patent Office 3,500,016
Patented Mar. 10, 1970

3,500,016
HEATER ASSEMBLY
John Karmazin, 3776 11th St.,
Wyandotte, Mich. 48192
Filed Oct. 9, 1967, Ser. No. 673,764
Int. Cl. H05b 3/02, 3/50; F28f 1/24
U.S. Cl. 219—365        8 Claims

ABSTRACT OF THE DISCLOSURE

A heater constructed of a press fit assembly including a plurality of spaced sheets formed with tubular projections disposed in nested relationship defining a conduit in which a heating element enclosed within a circumferentially expandable and contractable tubular sleeve is disposed in heat conductive contact therewith.

BACKGROUND OF THE INVENTION

A variety of heating devices have heretofore been used or proposed for use which conventionally are of a welded or brazed construction so as to assure good heat conductivity and transmission between the heating element and the heat transfer surfaces thereof. Constructions of the forgeoing type necessitating such a welding or brazing of the assembly has occasioned difficulty in connection with the design and fabrication of such units which in turn has contributed toward a substantial increase in the cost thereof. In such prior art type heater devices the brazing or welding of the individual components has been deemed necessary in order to assure a continued contact between the heat transfer surfaces and the heating element due to differential coefficients of expansion of the components as well as variations in their actual operating temperatures.

The foregoing problems and disadvantages of heaters of the types heretofore known are overcome in accordance with the construction and fabrication technique comprising the present invention in which a substantial simplification is achieved in the structure and assembly of the heater device obviating the need for a welding or brazing of the components together while simultaneously assuring a continued intimate contact between the heating element and the heat transfer surfaces thereof.

SUMMARY OF THE INVENTION

The foregoing and other benefits of the present invention are attained by a heater assembly consisting of a plurality of spaced substantially parallel sheets of a heat conductive material each of which is integrally formed with at least one tapered tubular projection that is adapted to be disposed in nested relationship with corresponding tubular projections of adjacent sheets forming in combination a tubular conduit having integrally connected heat transfer fins. A heating element including a tubular sleeve which is circumferentially expandable and contractable is disposed in contact within the tubular conduit and in heat conducting relationship therewith maintaining continued heat conductive contact with the heat transfer fins in spite of variations in the thermal coefficient of expansion of the several components and temperature differentials that may occur during operation.

Additional advantages and benefits of the present invention will become apparent upon a reading of the preferred embodiments taken in conjunction with the accompanying drawing.

DESCRIPTION OF THE DRAWING

FIGURE 1 is a front elevational view partly in section of a heater assembly constructed in accordance with the preferred practice of the present invention;

FIGURE 2 is a transverse sectional view through the heater shown in FIGURE 1 and taken substantially along the line 2—2 thereof;

FIGURE 3 is an enlarged fragmentary longitudinal sectional view through one end of a heating element and the finned heat transfer surfaces connected thereto, as shown in FIGURE 2 and taken substantially along the line 3—3 thereof;

FIGURE 4 is a magnified transverse sectional view through a heating element as shown in FIGURE 1 and taken substantially along the line 4—4 thereof, and FIGURE 5 is a magnified transverse sectional view taken through a heating element illustrating an alternative satisfactory embodiment in comparison to that shown in FIGURE 4.

DESCRIPTION OF THE PREFERRED EMBODIMENTS

The heater assembly or heat exchanger, comprising the present invention as best seen in the drawing, is conventionally contained within a suitable frame or housing 6 which in the embodiment illustrated is of an inverted generally U-shaped configuration being open along its lower edge and formed with a plurality of slots or openings 8 along the upper edge through which a flluid such as air is circulated during the normal convection-type heating thereof. The ends of the housing 6 are formed with suitable end walls 10 on which the assembly of heating elements and heat transfer surfaces are adapted to be mounted such as by U-shaped brackets 12. The configuration of the housing 6 is typical of one adapted for installation or mounting against a wall or other upright surface. It will be appreciated that the configuration of the housing itself can be modified so as to provide optimum guidance of the normal convection flow of air over the heat transfer surfaces consistent with the intended manner of installation and use of the heater assembly.

The composite heating device mounted within the housing 6 is comprised of a plurality of spaced substantially parallel sheets 14 of a heat conductive material each of which is integrally formed with at least one tapered tubular projection 16. The sheets 14, in the embodiment illustrated, are disposed in a vertical plane and serve as heat transfer fins for transferring heat to a fluid passing thereover either through natural or forced convection. In the embodiment illustrated each of the sheets 14 is formed with two spaced tubular projections 16 which are adapted to be disposed in nested aligned relationship with the tubular projections on the adjacent sheets collectively forming a tubular conduit indicated at 18 in FIGURE 3.

A heating element 20, including a tubular sleeve 22, is slidably disposed within the tubular conduit 18 and is positioned with the periphery thereof in initimate heat conductive contact with the deformed end portions 24 of the tubular projections 16 defining the tubular conduit. As best seen in FIGURE 3, the heating element 20 is filled with a suitable electrical insulating material such as a refractory substance 26 in which a helically wound resistance wire 28 is embedded. Each end of the resistance wire 28 is electrically connected to a terminal 30 which extends through and is supported by a suitable insulator block 32 which is connected to the U-shaped bracket 12 for maintaining the heating device in appropriate position within the housing. A suitable electrical lead 34 is connected to each of the end terminals 30 and in turn is connected to a suitable source of electrical energy such as the source 36 schematically illustrated in FIGURE 1.

It will be apparent from the foregoing construction that the passage of electrical current through the helical resistance wire 28 generates heat which is conducted through the refractory substance 26 to the tubular sleeve 22 and thence to the deformed end portions 24 of the tubular projections from which it passes to the fins and is transferred to the fluid passing relative thereto. It will also be apparent that the progressive dissipation of heat from the several components produces a temperature differential between the parts which will vary depending on such factors as the heat output of the resistance wire, the geometry of the fins and tubular projections thereon, the rate of fluid flow, and the temperature of the fluid relative to the heat transfer surfaces. Accordingly, all or portions of the tubular conduits and tubular sleeve will vary in temperature such that variations in the radial expansions thereof will occur during operation. In order to assure a continued intimate contact between the tubular sleeve of the heating element and hte internal surface of the deformed end portions of the tubular conduit, the tubular sleeve as best seen in FIGURE 4 is constructed so as to undergo circumferential expansion and contraction as required to maintain such intimate contact. Circumferential expansion and contraction of the tubular sleeve in accordance with the embodiment illustrated in FIGURE 4 is achieved by providing the tubular sleeve with a radially offset longitudinal section 38 which extends longitudinally for the entire length of the tubular sleeve and is disposed in underlying sliding and heat conductive contact with the inner surface of the overlying edge portion 40.

An alternative satisfactory construction for the tubular sleeve to achieve the requisite flexibility and circumferential expansion and contraction as necessitated by thermal expansion is illustrated in FIGURE 5. The tubular sleeve 42, as shown, comprises a rolled sheet in a spiral configuration with adjacent edges disposed in sliding heat conductive relationship and with the longitudinal opposite edge portions 44 thereof formed of a tapered cross section to provide a smooth peripheral and interior contour. In each of the constructions as shown in FIGURES 4 and 5 the interior of the tubular sleeves is filled with the refractory substance 26 in which the resistance wire 28 is centrally embedded. It is generally preferred that the tubular sleeve is formed so as to incorporate a residuary stress tending to normally bias the sleeve to a circumferentially expanded position in opposition to the restraint imposed by the encircling tubular projections to assure continuous heat conductive contact therewith.

In the fabrication and assemby of the heater assembly as hereinabove described, a plurality of individual sheets 14 incorporating one or more tubular projections 16 spaced therealong are positioned in loose aligned nested relationship and a heating element is slidably inserted through the tubular conduit formed thereby. As will be noted in FIGURE 3, the throat portion indicated at 46 of each of the tubular projections is of a diameter greater than that of the periphery of the tubular sleeve by an amount to permit two thicknesses of material to be disposed therebetween. The outer end of the tapered tubular projection is of a diameter to provide an easy sliding fit relative to the perlphery of the tubular sleeve of the heating element facilitating a stacging of the sheets in nested relationship thereon. The resultant loosely fit assembly of nested sheets is thereafter compacted by means of longitudinally compressing the sheets against a suitable die indicated in phantom at 48 in FIGURE 3 whereupon a swaging of the outer portions of the tubular projections occurs effecting the formation of the deformed end portions 24 which are disposed in intimate bearing contact around the periphery of the sleeve of the heating element. The tight bearing fit thus achieved assures retention of the sheets in appropriate parallel longitudinally spaced relationship along the heating element and additionally assures uniform heat transfer from the heating element to the tubular projections and the fins integrally connected thereto.

It will be understood by those skilled in the art that while the preferred embodiments as hereinabove described are well calculated to achieve the benefits of the present invention, the present invention is susceptible to modification and change within the scope of the subjoined claims to further include, for example, variations in the cross sectional configuration of the heating elements and tubular projections and the configuration of the fins so as to provide optimum performance for any intended end use.

What is claimed is:

1. A heater assembly comprising a plurality of spaced substantially parallel sheets each integrally formed with at least one tapered tubular projection thereon, the tubular projections of adjacent said sheets disposed in nested relationship forming a tubular conduit having integrally connected fins thereon, and a heating element including a tubular sleeve disposed in contact within said conduit and in heat conductive relationship therewith, said tubular sleeve formed of a rolled sheet having one of its longitudinally extending edge sections radially offset and dispossed in conforming underlying sliding heat conductive contact with the inner surface of the overlying other longitudinally extending edge section forming a substantially continuous and uninterrupted peripheral sleeve surface providing for circumferential expansion and contraction thereof to maintain continued contact of the periphery of said sleeve with the interior of said conduit.

2. The heater assembly as defined in claim 1, further characterized in that said tubular sleeve is normally biased toward circumferential expansion to maintain contact with the interior of said conduit.

3. The heater assembly as defined in claim 1, wherein said tubular sleeve contains an electric resistance element extending longitudinally therethrough and disposed in electrical insulated relationship relative to said sleeve.

4. The heater assembly as defined in claim 1, further including a housing for enclosing at least a portion of said fins for guiding the flow of a fluid in heat transfer relationship thereover.

5. The heater assembly as defined in claim 1, wherein said assembly incorporates a plurality of said conduits and said heating elements disposed in longitudinally extending spaced relationship.

6. The heater assembly as defined in claim 1, wherein the outer end portions of each of said tubular projections are swaged into firm contact with the periphery of said sleeve.

7. The heater assembly as defined in claim 1, wherein said one longitudinally extending edge section extends around substantially the entire inner surface of said sleeve.

8. The heater assembly as defined in claim 7, in which the edges of said longitudinally extending sections are tapered to conform with the contour of the adjacent abutting sheet, providing a smooth exterior and interior sleeve surface.

References Cited

UNITED STATES PATENTS

| 1,835,602 | 12/1931 | Kercher | 338—251 |
| 2,170,174 | 8/1939 | Wiegand | 219—365 |
| 2,225,850 | 12/1940 | Wright | 219—365 X |
| 3,221,399 | 12/1965 | Karmazin | 29—157.3 |

FOREIGN PATENTS

| 543,018 | 2/1945 | Great Britain. |

JOSEPH V. TRUHE, Primary Examiner

MARTIN C. FLIESLER, Assistant Examiner

U.S. Cl. X.R.

165—182; 219— 376, 530, 540, 544